United States Patent Office 3,251,771
Patented May 17, 1966

3,251,771
SYNTHETIC LUBRICANT COMPOSITION
George J. Benoit, Jr., San Anselmo, Calif., assignor to Chevron Research Company, a corporation of Delaware
No Drawing. Filed July 23, 1962, Ser. No. 211,845
1 Claim. (Cl. 252—32.7)

This application is a continuation-in-part of George J. Benoit, Jr., U.S. application Serial No. 832,467, filed August 10, 1959, which has now been abandoned.

This invention relates to a novel synthetic lubricant composition. More particularly, the invention is concerned with a superior new synthetic lubricant composition for gas turbine lubrication.

It is important that lubricant compositions for gas turbines, such as those employed in aircraft, possess a number of special properties due to the extraordinarily severe operating conditions. Modern aircraft gas turbines, for example, operate usually at exceptionally high temperatures following normally low starting temperatures. At present, there is a trend towards still higher operating temperatures in an effort to provide increased thrust power in aircraft gas turbines, and operating conditions are made even more severe.

In view of these severe operating conditions noted above, it is particularly important that lubricant compositions for gas turbines should be thermally stable at high temperature to avoid decomposition and deterioration. Thermal degradation of aircraft gas turbine lubricants to any substantial degree results in the formation of coke. This coke deposits on bearing cages and housings and causes plugging of oil filters. It is expected that coke formation will be an even greater problem in future engines operating at higher temperatures.

Aircraft gas turbine lubricant compositions should remain fluid at low as well as high temperatures in order to provide proper lubrication at all times. Good viscosity-temperature characteristics are also important since the lubricant compositions should be adaptable to changes in temperature conditions without extreme variations in viscosity.

Although certain lubricants, particularly the synthetic oil base type, have some of the above desired properties, they have not been altogether satisfactory. The use of additives to overcome such deficiencies has not been a satisfactory solution since many promising base oils are apparently adversely affected by the presence of conventional additives.

It has now been found that a surprisingly effective aircraft gas turbine lubricating oil composition having the special properties discussed above is provided in the composition comprising a major proportion of a dialkyl diester of hexahydroterephthalic acid having 5 to 20 carbon atoms in each of the alkyl groups, a minor proportion of a neutral aryl phosphate such as tricresyl phosphate sufficient to reduce wear, a minor proportion of an aromatic amine such as phenothiazine sufficient to inhibit oxidation, a minor proportion of a metal deactivator such as quinizarin sufficient to serve as metal deactivator, a minor proportion of an amine salt of an acid alkyl ester of phosphoric acid such as mixed mono- and didodecyl phosphoric acid octadecenyl amine salt sufficient to improve the extreme pressure properties and a minor proportion of a silicone polymer having a viscosity in the range from about 50,000 to 250,000 centistokes at 25° C. such as dimethyl silicone having a viscosity of about 60,000 centistokes at 25° C. sufficient to suppress foaming.

The superior new synthetic lubricant compositions for gas turbines in accordance with this invention possess excellent thermal stability. They are able to withstand degradation at high temperatures for extended periods. Coke formation at high temperatures similar to those encountered in the improved gas turbine engines recently designed for aircraft is maintained at a remarkably low level compared to other commonly accepted synthetic oil base gas turbine engine lubricant compositions.

The lubricant compositions of the invention are also characterized by unusually low freezing points. The viscosity changes of the compositions with variations in temperature are remarkably low as indicated by the high viscosity index of the compositions.

The dialkyl diesters of hexahydroterephthalic acid are illustrated by the following general formula:

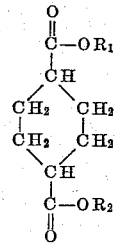

in which $R_1$ and $R_2$ are alkyl groups of 5 to 20 carbon atoms each which may be the same or different as one another. Preferably, the alkyl groups contain from 6 to 15 carbon atoms. Also in a preferred embodiment, $R_1$ and $R_2$ are derived by esterifying the hexahydroterephthalic acid with a mixture of branched chain alcohols of from 7 to 13 carbon atoms with an average of 10 carbon atoms each.

Examples of suitable dialkyl diesters of hexahydroterephthalic acid for use in the compositions of this invention include n-hexyl 2-ethylbutyl hexahydroterephthalate, 2-ethylhexyl isooctyl hexahydroterephthalate, dodecyl "Oxo" tridecyl hexahydroterephthalate, nonyl octadecyl hexahydroterephthalate, etc.

In the above examples the "Oxo" decyl and "Oxo" tridecyl esterifying groups are derived from "Oxo" decyl alcohol and "Oxo" tridecyl alcohol, respectively. The "Oxo" decyl alcohol is a 10 carbon atom branched chain aliphatic alcohol obtained from propylene trimer by the conventional "Oxo" reaction, employing the usual conditions and catalysts known to the art. The "Oxo" tridecyl alcohol is a similar type of alcohol containing 13 carbon atoms produced by oxonation of propylene tetramer. Because of the nature of the reaction involving the addition of carbon monoxide to the double bond, any quaternary carbon atoms in the "Oxo" alcohols are of necessity further removed than the beta position. The "Oxo" reaction is described in detail beginning at page 699 of volume 9 in the Encyclopedia of Chemical Technology by Kirk and Othmer, published 1952, by the Interscience Encyclopedia, Inc., New York, New York.

From about 0.2 to 5%, and preferably from about 0.5 to 3% by weight of aromatic amine oxidation inhibitor is employed to provide oxidation stability at high temperatures. Suitable aromatic amine oxidation inhibitors include ortho-aminophenol, hydroxy diphenylamine, phenothiazine, diphenylamine, dodecyl aniline, 3-pentadecyl-4-aminophenol, α-naphthylamine and phenyl-α-naphthylamine. For present purposes, the diarylamine oxidation inhibitors such as phenyl-α-napthylamine and phenothiazine are preferred, phenyl-α-napthylamine being most preferred for effective inhibition of oxidation.

Extreme pressure additives for use in the lubricant compositions of the invention are preferably alkylamine salts or alkenylamine of acid alkyl esters of phosphoric acid and blends of said salts with acid alkyl esters of phosphoric acid in which the amine salt amounts to at least 25% by weight of the blend. Suitable alkyl groups contain from 8 to 18 carbon atoms each. The extreme pressure additive is employed in the amount of from about 0.05 to 1%, and preferably from about 0.1 to 0.5% by weight. Illustrative extreme pressure additives of the foregoing type are dodecylamine dodecyl acid phosphate, octadecenylamine dodecyl acid phosphate, blends of from 25 to 95% dodecylamine dodecyl acid phosphate and from 75 to 5% of dodecyl dihydrogen phosphate, octadecenylamine salts of mixed mono- and didodecyl phosphates, octylamine dioctyl phosphate, hexadecylamine dodecyl acid phosphate, octadecylamine dioctadecyl phosphate and blends containing 2-ethylhexylamine, 2-ethylhexyl acid phosphate, and 2-ethylhexyl dihydrogen phosphate in equal proportions.

Additives to improve oiliness and reduce wear are employed in the compositions usually in amounts of from 0.5 to 5% by weight. Suitable additives of this type are the neutral aryl phosphates and neutral alkyl aryl phosphates. Representative additives are tricresyl phosphate, butyl diphenyl phosphate, benzyl dicresyl phosphate, diphenyl dicresyl phosphate, etc. Tricresyl phosphate is particularly effective in the compositions and preferred for that reason.

Conventional metal deactivators are employed in the compositions in amounts of from 0.005 to 0.2%. Such metal deactivators include quinizarin, alizarin and di-(2-hydroxybenzyl)1,2-propylene diamine with quinizarin being preferred for its effectiveness in the compositions.

Foam inhibitors are employed in amounts of from 0.0001 to 0.02% by weight in the compositions. Particularly effective for this purpose are the dialkyl silicone polymers and alkyl aryl silicone polymers such as dimethyl silicone, diethyl silicone, methylethyl silicone, methylphenyl silicone, and the like. Such silicones are characterized by viscosities in the range from about 50,000 to 250,000 centistokes at 25° C. Dimethyl silicone is presently preferred for its availability and effectiveness in the compositions.

The following examples will serve as further illustrations of the compositions according to this invention. Unless otherwise specified, the proportions given are on a weight basis.

*Example*

2 moles of "Oxo" decyl alcohol are reacted with 1 mole of terephthalic acid. Sodium bisulfate is employed as esterification catalyst. The reaction mixtures are washed with sodium carbonate solution and then with water. The washed product is treated with activated charcoal to effect decolorization and then distilled under a vacuum to remove unreacted materials.

The "Oxo" decyl diester of hexahydroterephthalic acid obtained above is hydrogenated in an autoclave at about 200° C. Raney nickel is used as hydrogenation catalyst. The initial hydrogen pressure is about 300–400 pounds per square inch and the maximum pressure during the run is about 1800 pounds per square inch gauge. The hydrogenation is complete and the run is discontinued after the pressure has remained nearly constant for 2 hours. The products are filtered through clay to remove spent catalyst and distilled under reduced pressure to remove by-products, etc.

The following table shows the physical characteristics of di-"Oxo"-decyl hexahydroterephthalate of the above example. For the purpose of comparison, other examples of "Oxo" decyl esters of various analogous acids are also included.

TABLE I

| Ester | Saponification No. | Viscosity Centistokes | | Viscosity Index | Approximate Pour Point, °F. |
|---|---|---|---|---|---|
| | | 100° F. | 210° F. | | |
| Di-"Oxo" decyl phthalate | 252 | 42 | 5.5 | 62 | −36 |
| Di-"Oxo" decyl isophthalate | 235 | 48 | 6.3 | 77 | −40 |
| Di-"Oxo" decyl terephthalate | 250 | 56.3 | 7.13 | 91 | −42 |
| Di-"Oxo" decyl hexahydrophthalate | 243 | 33.27 | 5.06 | 81 | −55 |
| Di-"Oxo" decyl hexahydroisophthalate | 216 | 29.46 | 5.07 | 110 | −59 |
| Di-"Oxo" decyl hexahydroterephthalate | 252 | 31.68 | 5.47 | 122 | −62 |

From the physical properties of the various phthalate and hexahydrophthalate esters in the above table, it is seen that the dialkyl diesters of hexahydroterephthalic acid are decidedly superior to the corresponding dialkyl diesters of phthalic acid, isophthalic acid, terephthalic acid, hexahydrophthalic acid, and hexahydroisophthalic acid.

A further evaluation of the effectiveness of the phthalic esters as aircraft gas turbine lubricants in accordance with this invention is provided by coking tests on the phthalic ester base lubricants compounded with conventional additives. In these tests the comparison of the results is facilitated by the employment of identically formulated compositions as follows:

Ester base stock _____ 94.378
Tricresylphosphate (oiliness additive) _____ 5.0
Phenothiazine (oxidation inhibitor) _____ 0.5
Quinizarin (metal deactivator) _____ 0.02
Mixed mono- and didodecyl phosphate octadecenyl amine salt _____ 0.1
Dimethyl silicone, 60,000 cs. at 25° C. (foam suppressant) _____ 0.002

The tests employed in the evaluations are standard tests known generally to the lubricating art by their descriptions in the table which follows.

The standard coking test involves maintaining the test oil in a bath at a constant level and splashing it against an overhead inclined plate a temperature of 600° F. In the present tests, a higher temperature of 700° F. was maintained throughout the test period of six hours in order to simulate the increasingly higher operating temperatures for aircraft gas turbines. The splashing is effected by steel wires rotated at a speed of 1050 r.p.m. as it is partially immersed in the oil. The coking value is the weight of the deposit formed on the underside of the plate during the test period. The description of this coking test is found in gas turbine oil specifications MIL–L–7808C and MIL–L–25336.

For the purpose of comparison, the following table also gives illustrative test results on a composition containing di-"Oxo" decyl hexahydrophthalate.

TABLE II

Deposit,
Ester: mgs.
  Di-"Oxo" decyl hexahydrophthalate _____ 2044
  Di-"Oxo" decyl hexahydroterephthalate _____ 552

The above test results show that the dialkyl diesters of hexahydroterephthalic acid are outstanding synthetic oil base fluids for aircraft gas turbine lubricating oils. They possess excellent thermal stability at high temperatures, as indicated by their low coke formation. In the same test it has been found that similar compositions employing as a base lubricant the commonly accepted di-(2-ethylhexyl)-sebacate give deposits of about 2700 mg. Not only are the dialkyl diesters of hexahydroterephthalic acid about five times better than the conventional di-2-ethylhexyl sebacate base fluid, but they are approximately four times as good as the closely related isomeric dialkyl diesters of hexahydrophthalic acid.

I claim:

An aircraft gas turbine engine lubricating oil composition consisting essentially of a major proportion of didecyl diester of hexahydroterephthalic acid, said decyl groups being derived from "Oxo" decyl alcohol, a minor proportion of tricresyl phosphate sufficient to reduce wear, a minor proportion of phenothiazine sufficient to inhibit oxidation, a minor proportion of quinizarin sufficient to serve as metal deactivator, a minor proportion of mixed mono- and didodecyl phosphoric acid octadecenyl amine salt sufficient to improve the extreme pressure properties and a minor proportion of dimethyl silicone having a viscosity of about 60,000 centistokes at 25° C. sufficient to suppress foaming.

References Cited by the Examiner
UNITED STATES PATENTS

| | | | |
|---|---|---|---|
| 2,801,968 | 8/1957 | Furby et al. | 252—32.5 |
| 2,889,354 | 6/1959 | Blake et al. | 252—57 |

DANIEL E. WYMAN, *Primary Examiner.*

ALPHONSO D. SULLIVAN, *Examiner.*